United States Patent
Braun et al.

(10) Patent No.: US 9,840,159 B2
(45) Date of Patent: Dec. 12, 2017

(54) ENERGY STORAGE DEVICE HAVING A DC VOLTAGE SUPPLY CIRCUIT AND METHOD FOR PROVIDING A DC VOLTAGE FROM AN ENERGY STORAGE DEVICE

(71) Applicant: Robert Bosch GmbH, Stuttgart (DE)

(72) Inventors: Martin Braun, Neustetten-Wolfenhausen (DE); Holger Rapp, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 14/901,307

(22) PCT Filed: Jun. 10, 2014

(86) PCT No.: PCT/EP2014/062044
§ 371 (c)(1),
(2) Date: Dec. 28, 2015

(87) PCT Pub. No.: WO2014/206724
PCT Pub. Date: Dec. 31, 2014

(65) Prior Publication Data
US 2016/0368392 A1    Dec. 22, 2016

(30) Foreign Application Priority Data

Jun. 28, 2013 (DE) .......... 10 2013 212 716

(51) Int. Cl.
*H02J 7/34*    (2006.01)
*B60L 11/18*   (2006.01)
(Continued)

(52) U.S. Cl.
CPC ....... *B60L 11/1855* (2013.01); *B60L 11/1811* (2013.01); *B60L 11/1864* (2013.01);
(Continued)

(58) Field of Classification Search
CPC .................................................. B60L 11/1855
See application file for complete search history.

(56) References Cited

U.S. PATENT DOCUMENTS

| 5,642,275 A | 6/1997 | Peng et al. |
| 2013/0127251 A1 | 5/2013 | Graovac et al. |

(Continued)

FOREIGN PATENT DOCUMENTS

| DE | 102010027857 | 10/2011 |
| DE | 102010027861 | 10/2011 |

(Continued)

OTHER PUBLICATIONS

International Search Report for Application No. PCT/EP2014/062044 dated Sep. 4, 2014 (English Translation, 2 pages).

*Primary Examiner* — Daniel Puentes
(74) *Attorney, Agent, or Firm* — Michael Best & Friedrich LLP

(57) ABSTRACT

The invention relates to a system having an energy storage device and a DC voltage supply circuit, wherein the energy storage device has at least two energy supply branches, which are each coupled at a first output to at least one respective output terminal of the energy storage device in order to generate an AC voltage at the output terminals, and at a second output to a shared bus, wherein each of the energy supply branches has a plurality of energy storage modules connected in series. The energy storage modules each comprise an energy storage cell module having at least one energy storage cell and a coupling device having a coupling bridge circuit made from coupling elements. The coupling elements are designed to selectively connect the energy storage cell module to the respective energy supply branch or to bypass the energy supply branch. The DC voltage supply circuit has: a bridge circuit having a plurality of first feed terminals, each of which is coupled to one of the (Continued)

output terminals of the energy storage device; two feeding nodes, at least one of which is coupled to the bridge circuit; and a module-tapping circuit that has at least one module switching branch having a commutating diode. Each of the at least one module switching branches connects a coupling node between two energy storage modules of one of the energy supply branches switchably to a feeding node.

17 Claims, 5 Drawing Sheets

(51) Int. Cl.
*H02M 3/04* (2006.01)
*H02M 7/06* (2006.01)
*H02M 7/44* (2006.01)
*H02J 7/00* (2006.01)
*H02M 7/483* (2007.01)

(52) U.S. Cl.
CPC ............ *H02J 7/0065* (2013.01); *H02M 3/04* (2013.01); *H02M 7/06* (2013.01); *H02M 7/44* (2013.01); *B60L 2210/10* (2013.01); *B60L 2210/40* (2013.01); *B60L 2240/526* (2013.01); *B60L 2240/527* (2013.01); *B60L 2240/547* (2013.01); *B60L 2240/549* (2013.01); *H02J 7/0024* (2013.01); *H02M 2007/4835* (2013.01); *Y02T 10/7005* (2013.01); *Y02T 10/7055* (2013.01); *Y02T 10/7061* (2013.01); *Y02T 10/7241* (2013.01)

(56) References Cited

U.S. PATENT DOCUMENTS

| | | | |
|---|---|---|---|
| 2013/0154379 A1* | 6/2013 | Tiefenbach | B60L 11/1853 307/77 |
| 2013/0193752 A1 | 8/2013 | Butzmann et al. | |
| 2013/0200693 A1 | 8/2013 | Butzmann et al. | |
| 2013/0249474 A1 | 9/2013 | Feuerstack et al. | |
| 2014/0203645 A1 | 7/2014 | Leu et al. | |

FOREIGN PATENT DOCUMENTS

| | | |
|---|---|---|
| DE | 102010041040 | 3/2012 |
| DE | 102010041074 | 3/2012 |
| DE | 102011075576 | 11/2012 |
| WO | 2011060823 | 5/2011 |
| WO | 2012038186 | 3/2012 |

\* cited by examiner

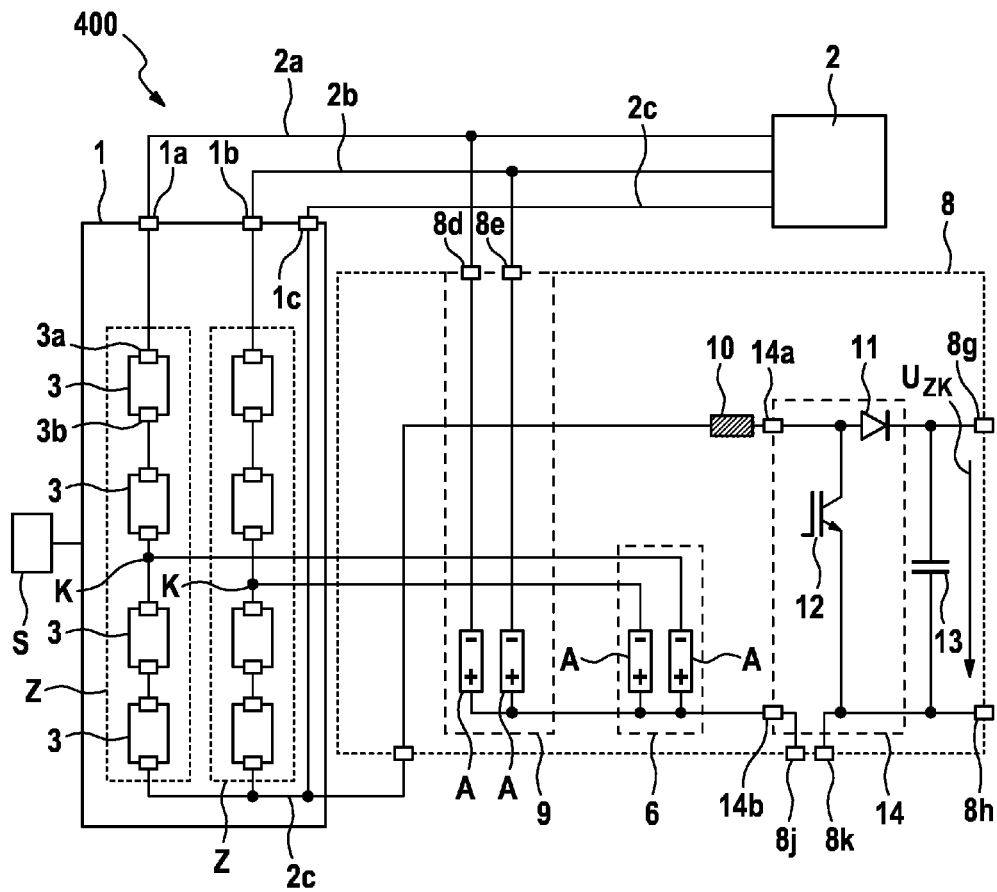
FIG. 5
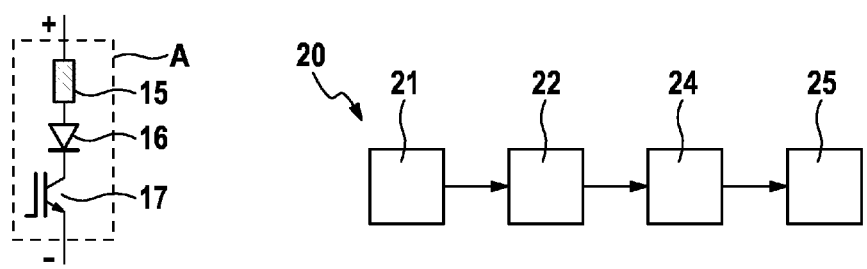
FIG. 6
FIG. 7

ENERGY STORAGE DEVICE HAVING A DC VOLTAGE SUPPLY CIRCUIT AND METHOD FOR PROVIDING A DC VOLTAGE FROM AN ENERGY STORAGE DEVICE

BACKGROUND OF THE INVENTION

The invention relates to an energy storage device having a DC voltage supply circuit and to a method for providing a DC voltage from an energy storage device, in particular a battery direct inverter that supplies an on-board vehicle electrical power supply system with a DC voltage.

The trend is that in the future electronic systems which combine new energy storage technologies with electrical drive technology will be used increasingly both in stationary applications, such as e.g. wind power installations or solar installations, and in vehicles such as hybrid or electric vehicles.

The feed of polyphase current into an electrical machine is usually realized by a converter in the form of a pulse-controlled inverter. For this purpose, a DC voltage provided by a DC voltage intermediate circuit can be converted into a polyphase AC voltage, for example a three-phase AC voltage. The DC voltage intermediate circuit is fed in this case by a string of battery modules interconnected in series. In order to be able to meet the requirements for power and energy provided for a respective application, often a plurality of battery modules are connected in series in a traction battery.

The series circuit comprising a plurality of battery modules is associated with the problem that the entire string fails if a single battery module fails. Such a failure of the energy supply string can result in a failure of the entire system. Furthermore, temporarily or permanently occurring power reductions of an individual battery module can result in power reductions in the entire energy supply string.

The document U.S. Pat. No. 5,642,275 A1 describes a battery system with an integrated inverter function. Systems of this type are known under the name Multilevel Cascaded Inverter or else Battery Direct Inverter (BDI). Such systems comprise DC sources in a plurality of energy storage module strings, which can be connected directly to an electrical machine or an electrical power supply system. In this case, single-phase or polyphase supply voltages can be generated. The energy storage module strings in this case have a plurality of energy storage modules connected in series, wherein each energy storage module has at least one battery cell and an assigned controllable coupling unit, which makes it possible to bridge the respectively assigned at least one battery cell or to switch the respectively assigned at least one battery cell into the respective energy storage module string, depending on control signals. In this case, the coupling unit can be designed in such a way that it additionally makes it possible to switch the respectively assigned at least one battery cell also with inverse polarity into the respective energy storage module string or else to interrupt the respective energy storage module string. By suitable driving of the coupling units, for example with the aid of pulse width modulation, suitable phase signals for controlling the phase output voltage can also be provided, with the result that a separate pulse-controlled inverter can be dispensed with. The pulse-controlled inverter required for controlling the phase output voltage is thus integrated into the BDI as it were.

BDIs usually have a higher efficiency, a higher degree of failsafety and a significantly lower harmonic content of their output voltage in comparison with conventional systems. The failsafety is ensured, inter alia, by virtue of the fact that defective, failed or not fully effective battery cells can be bridged in the energy supply springs by suitable driving of the coupling units assigned to them. The phase output voltage of an energy storage module string can be varied and in particular set in a stepped manner by corresponding driving of the coupling units. In this case, the stepping of the output voltage results from the voltage of an individual energy storage module, wherein the maximum possible phase output voltage is determined by the sum of the voltages of all the energy storage modules of an energy storage module string.

The documents DE 10 2010 027 857 A1 and DE 10 2010 027 861 A1, for example, disclose battery direct inverters having a plurality of battery module strings which can be directly connected to an electrical machine.

A constant DC voltage is not available at the output of BDIs since the energy storage cells are divided among different energy storage modules and the coupling devices thereof have to be driven in a targeted manner for generating a voltage level. As a result of this distribution, a BDI is basically not available as a DC voltage source, for example for feeding an on-board electrical power supply system of an electrical vehicle. Accordingly, the charging of the energy storage cells via a conventional DC voltage source is not readily possible either.

Therefore, there is a need for an energy storage device having a DC voltage supply circuit and a method for operating same with which a DC voltage consumer can be fed with a DC voltage from the energy storage device or a DC voltage charging circuit can be coupled to the energy storage device.

SUMMARY OF THE INVENTION

In accordance with one aspect, the present invention provides a system comprising an energy storage device and a DC voltage supply circuit, wherein the energy storage device has at least two energy supply branches which are coupled at a first output in each case to at least one output terminal of the energy storage device for generating an AC voltage at the output terminals and are coupled at a second output to a common busbar wherein each of the energy supply branches has a multiplicity of series-connected energy storage modules. The energy storage modules comprise in each case: an energy storage cell module having at least one energy storage cell; and a coupling device having a coupling bridge circuit composed of coupling elements wherein the coupling elements are designed selectively to switch the energy storage cell module into the respective energy supply branch or to bypass it in the energy supply branch. The DC voltage supply circuit has a bridge circuit having a multiplicity of first feed terminals which are in each case coupled to one of the output terminals of the energy storage device, two feed nodes, at least one of which is coupled to the bridge circuit, and a module tapping circuit, which has at least one module switching branch having a commutation diode, wherein each of the at least one module switching branches connects a coupling node between two energy storage modules of one of the energy supply branches to a feed node in a switchable manner.

In accordance with a further aspect, the present invention provides a method for providing a DC voltage from a system according to the invention in accordance with the first aspect, comprising the following steps: determining the output voltage of the energy supply branches at the output terminals of the energy storage device; switching coupling of a coupling node between two energy storage modules of one of the energy supply branches Z to a feed node which is not connected to the busbar of the energy supply device, or switching coupling of a first coupling node between two energy storage modules of one of the energy supply branches Z to the first feed node and switching coupling of a second coupling node between two energy storage modules of one of the energy supply branches Z to the second feed node, provided that neither of the two feed nodes is connected to the busbar of the energy supply device— advantageously primarily if the determined output voltage is lower than the maximum output voltage of an individual energy storage module 13, operating the energy storage modules situated between the coupling nodes and a busbar of the energy storage device in such a way that a potential that differs from the potential of the busbar at least by the maximum output voltage of an energy storage module is always present at least at one of the coupling nodes; and setting the output voltage of the other energy storage modules of each of the energy supply branches in such a way that the total output voltage of the energy supply branches at the output terminals of the energy storage device corresponds to the output voltage determined in the first step.

It is a concept of the present invention to provide a circuit for the outputs of a modularly embodied energy storage device, in particular of a battery direct inverter, which can be used to provide a DC voltage for the operation of a DC voltage consumer, for example a DC-DC converter of an on-board electrical power supply system of an electrically operated vehicle, during the operation of the energy storage device for the driving of an electrical machine. For this purpose, provision is made for coupling a diode bridge circuit to the output terminals of the energy storage device, with the aid of which a DC voltage can be tapped off at the output terminals. At the same time, a module tapping circuit serves to carry away a DC voltage selectively from a selected portion of the energy storage modules to the DC voltage consumer.

It is particularly advantageous in this case that a further DC voltage level, for example for feeding an intermediate circuit capacitor of the on-board electrical power supply system from the energy storage device, is always present, regardless of the operating state in which the energy storage device is currently being operated. Particularly in the case of a low total output voltage of the energy storage device that falls below the output voltage of an individual energy storage module, the module tapping circuit can be used in order to be able to operate the tapped portion of the energy storage modules with full module output voltage and thus to be able to provide the DC voltage for the DC voltage consumer. The total output voltage of the energy storage device is not influenced thereby, since the other energy storage modules can be correspondingly switched with opposite polarity in order to be able to compensate for the output voltage of the tapped portion of the energy storage modules.

A further advantage of said module tapping circuit is that a charging circuit, for example from a range extender in an electrically operated vehicle, can be coupled in series with the DC voltage consumer, and energy for charging the energy storage cells even during supply operation of the energy storage device can be fed at least into the energy storage modules coupled via the module tapping circuit. A voltage balancing method within the energy supply branches makes it possible for the charging energy then to be redistributed along all the energy storage cells of the energy storage modules.

In accordance with one embodiment of the system according to the invention, the system can furthermore comprise a DC-DC converter coupled between the first feed node and the second feed node. In this case, in accordance with one embodiment, the DC-DC converter can have a step-up converter or a forward converter.

In accordance with a further embodiment of the system according to the invention, the DC voltage supply circuit can have two charging circuit terminals and a charging circuit, which is coupled in series with the DC-DC converter via the two charging circuit terminals, and which is designed to provide a charging DC voltage for the energy storage cell modules of the energy storage device.

In accordance with a further embodiment of the system according to the invention, the bridge circuit can have a multiplicity of first bridge switching branches having a diode or a series circuit formed by a diode and a bridge coupling switch which are coupled in each case between the first feed node and one of the multiplicity of first feed terminals.

In accordance with a further embodiment of the system according to the invention, the bridge circuit can have a multiplicity of second feed terminals which are coupled in each case to one of the output terminals of the energy storage device.

In accordance with a further embodiment of the system according to the invention, the bridge circuit can have a multiplicity of second bridge switching branches having a diode or a series circuit formed by a diode and a bridge coupling switch, which are coupled in each case between the second feed node and one of the multiplicity of second feed terminals.

In accordance with a further embodiment of the system according to the invention, the number of energy storage modules in the respective energy supply branches can be identical on both sides of the respective coupling node. This advantageously makes voltage compensation on both sides of the coupling nodes particularly simple in terms of driving technology.

In accordance with a further embodiment of the system according to the invention, the system can furthermore have an n-phase electrical machine having n phase terminals, which is coupled to the output terminals of the energy storage device, wherein $n \geq 1$.

In accordance with a further embodiment of the invention, the n-phase electrical machine can have a winding star point that is led out from the machine. Furthermore, said winding star point can be connected to the busbar of the energy storage device. This is particularly advantageous in the case of two-phase machines (n=2).

BRIEF DESCRIPTION OF THE DRAWINGS

Further features and advantages of embodiments of the invention will become apparent from the following description with reference to the accompanying drawings.

In the figures:

FIG. 5 shows a schematic illustration of a system comprising an energy storage device and a DC voltage supply circuit in accordance with a further embodiment of the present invention;

FIG. 6 shows a schematic illustration of a module switching branch or bridge switching branch for a DC voltage supply circuit in accordance with a further embodiment of the invention;

FIG. 7 shows a schematic illustration of a method for providing a DC voltage from an energy storage device in accordance with a further embodiment of the present invention;

DETAILED DESCRIPTION

Figure 1:
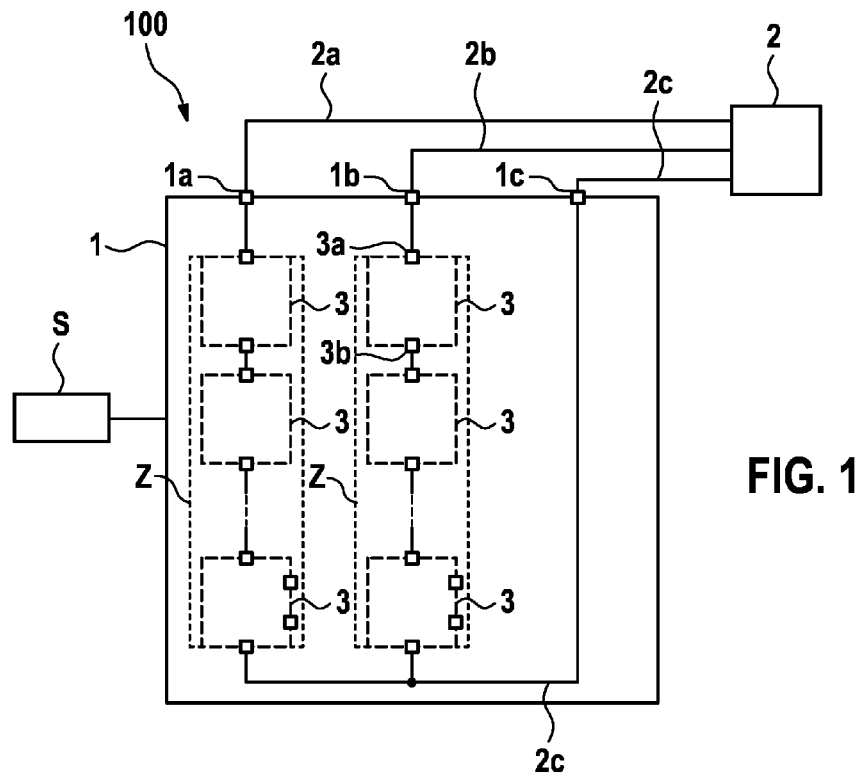
FIG. 1 shows a schematic illustration of a system comprising an energy storage device.

FIG. 1 shows a schematic illustration of a system 100 comprising an energy storage device 1 for the voltage conversion of DC voltage provided in energy storage modules 3 into an n-phase AC voltage. The energy storage device 1 comprises a multiplicity of energy supply branches Z, two of which are shown by way of example in FIG. 1, which are suitable for generating a two-phase AC voltage, for example for a transverse flux machine 2. However, it is clear that any other number of energy supply branches Z can likewise be possible. The energy supply branches Z can have a multiplicity of energy storage modules 3 which are connected in series in the energy supply branches Z. In each case three energy storage modules 3 per energy supply branch Z are shown by way of example in FIG. 1, but any other number of energy storage modules 3 can likewise be possible. At each of the energy supply branches Z, the energy storage device 1 has an output terminal 1a and 1b, which are respectively connected to phase lines 2a and 2b. In the example in FIG. 1, the phase line 2c of the electrical machine 2 is directly connected via the star point of the machine 2 to a busbar 2c, which is in turn coupled to input terminals, preferably the star point, of the energy supply branches Z. However, it can also be possible for the electrical machine 2 not to be coupled with feedback via a phase line 2c to the energy storage device 1. This can be chosen depending on the type and design of the electrical machine 2.

The system 100 can furthermore comprise a control device S, which is connected to the energy storage device 1 and with the aid of which the energy storage device 1 can be controlled in order to provide the desired output voltages at the respective output terminals 1a, 1b and 1c.

The energy storage modules 3 in each case have two output terminals 3a and 3b, via which an output voltage of the energy storage modules 3 can be provided. Since the energy storage modules 3 are primarily connected in series, the output voltages of the energy storage modules 3 add up to a total output voltage that can be provided at the respective one of the output terminals 1a, 1b and 1c of the energy storage device 1.

Figure 2:
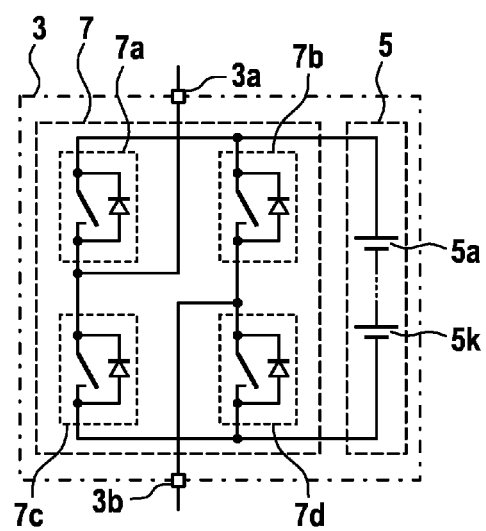
FIG. 2 shows a schematic illustration of an energy storage module of an energy storage device.

Exemplary structural designs of the energy storage modules 3 are shown in greater detail in FIG. 2. The energy storage modules 3 here in each case comprise a coupling device 7 having a plurality of coupling elements 7a, 7b, 7c and 7d. The energy storage modules 3 furthermore in each case comprise an energy storage cell module 5 having one or a plurality of series-connected energy storage cells 5a to 5k.

Figure 3:
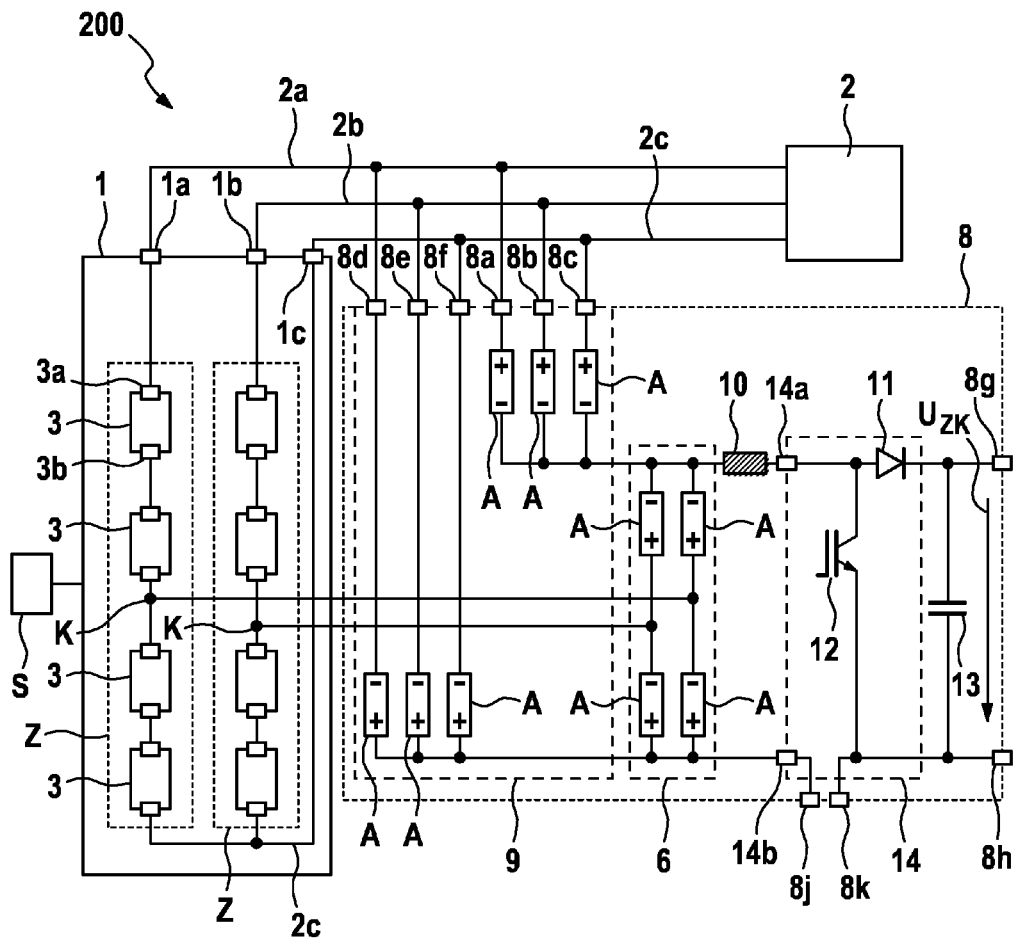
FIG. 3 shows a schematic illustration of a system comprising an energy storage device and a DC voltage supply circuit in accordance with one embodiment of the invention.

The energy storage cell module 5 can in this case have for example series-connected energy storage cells 5a to 5k, for example lithium-ion cells. In this case, the number of energy storage cells 5a to 5k in the energy storage modules 3 shown in FIGS. 2 and 3 is two, for example, but any other number of energy storage cells 5a to 5k is likewise possible.

The energy storage cell modules 5 are connected to input terminals of the associated coupling device 7 via connecting lines. The coupling device 7 in FIG. 2 is embodied by way of example as a full-bridge circuit having in each case two coupling elements 7a, 7c and two coupling elements 7b, 7d. The coupling elements 7a, 7b, 7c, 7d here can in each case have an active switching element, for example a semiconductor switch, and a freewheeling diode connected in parallel therewith. Provision can be made here for the coupling elements 7a, 7b, 7c, 7d to be embodied as MOSFET switches, which already have an intrinsic diode, or IGBT switches.

The coupling elements 7a, 7b, 7c, 7d can be driven, for example with the aid of the control device S illustrated in FIG. 1, in such a way that the respective energy storage cell module 5 is selectively switched between the output terminals 3a and 3b or that the energy storage cell module 5 is bridged. With reference to FIG. 2, the energy storage cell module 5 can be switched for example in the forward direction between the output terminals 3a and 3b by virtue of the active switching element of the coupling element 7d and the active switching element of the coupling element 7a being set to a closed state, while the other two active switching elements of the coupling elements 7b and 7c are set to an open state. A bridging state can be established, for example by virtue of the two active switching elements of the coupling elements 7a and 7b being set to the closed state, while the two active switching elements of the coupling elements 7c and 7d are held in the open state. A second bridging state can be established by virtue of the two active switching elements of the coupling elements 7a and 7b being held in the open state, while the two active switching elements of the coupling elements 7c and 7d are set to the closed state. Finally, the energy storage cell module 5 can be switched for example in the reverse direction between the output terminals 3a and 3b by virtue of the active switching element of the coupling element 7b and the active switching element of the coupling element 7c being set to a closed state, while the other two active switching elements of the coupling elements 7a and 7d are set to an open state. By means of suitable driving of the coupling devices 7, therefore individual energy storage cell modules 5 of the energy storage modules 3 can be integrated into the series circuit of an energy supply branch Z in a targeted manner and with arbitrary polarity.

By way of example, the system 100 in FIG. 1 serves for feeding a two-phase electrical machine 2, for example in an electrical drive system for an electrically operated vehicle. However, provision can also be made for using the energy storage device 1 for generating electric current for an energy supply network 2. The energy supply branches Z can be connected to a busbar 2c (reference potential rail) at their end connected to form a star point. Even without further connection to a reference potential outside the energy supply device 11, the potential of the ends of the energy supply branches Z that are connected to form a star point can be stipulated by definition as reference potential.

Generating a phase voltage between the output terminals 1a and 1b, on the one hand, and the busbar 2c, on the other hand, usually requires only a portion of the energy storage cell modules 5 of the energy storage modules 3. The coupling devices 7 thereof can be driven in such a way that the total output voltage of an energy supply branch Z can be set in a stepped manner in a rectangular voltage/current adjustment range between the negative voltage of an individual energy storage cell module 5 multiplied by the number of energy storage modules 3 and the positive voltage of an individual energy storage cell module 5 multiplied by the number of energy storage modules 3, on the one hand, and the negative and the positive rated current through an individual energy storage module 3 on the other hand.

Such an energy storage device 1 as shown in FIG. 1 has different potentials at the output terminals 1a, 1b at different points in time during operation and, therefore, cannot readily be used as a DC voltage source. Particularly in electrical drive systems of electrically operated vehicles, it is often desirable to feed the on-board electrical power supply system of the vehicle, for example a high-voltage on-board electrical power supply system or a low-voltage on-board electrical power supply system, from the energy storage device 1. Therefore, a DC voltage supply circuit is provided, which is designed to be connected to an energy storage device 1 and, fed by that, to provide a DC voltage, for example for the on-board electrical power supply system of an electrically operated vehicle.

FIG. 3 shows a schematic illustration of a system 200 comprising an energy storage device 1 and such a DC voltage supply circuit 8. The DC voltage supply circuit 8 is coupled to the energy storage device 1 via first collective terminals 8a, 8b and 8c, on the one hand and via second collective terminals 8d, 8e and 8f, on the other hand. A DC voltage $U_{ZK}$ of the DC voltage supply circuit 8 can be tapped off at tapping terminals 8g and 8h. At the tapping terminals 8g and 8h, for example, a further DC-DC converter (not illustrated) for an on-board electrical power supply system of an electrically operated vehicle can be connected or—given suitable matching between the voltage $U_{ZK}$ between the tapping terminals 8g and 8h and the on-board electrical power supply system voltage—said on-board electrical power supply system can be connected directly.

In the example in FIG. 3, the DC voltage supply circuit 8 has a full-bridge circuit 8, which is coupled via the first and second collective terminals 8a to 8f in each case to one of the output terminals 1a, 1b, 1c of the energy storage device 1. The collective terminals 8a to 8f here can be coupled for example to the phase lines 2a, 2b and 2c of the system 200. The full-bridge circuit 9 can have bridge switching branches A, which are illustrated in greater detail by way of example in FIG. 6. In this case, the pole designations "+" and "−" of the bridge switching branch A, illustrated in FIG. 6 correspond to the pole designations "+" and "−" of the elements A illustrated in FIG. 3 (and hereinafter also FIGS. 4 and 5), that is to say that that input terminal of the bridge switching branch A which is designated by "+" in FIG. 6 corresponds to those input terminals of the elements A which are designated by "+" in FIGS. 3 to 5, and that input terminal of the bridge switching branch A which is designated by "−" in FIG. 6 corresponds to those input terminals of the elements A which are designated by "−" in FIGS. 3 to 5. That pole of a bridge switching branch which is designated by "+" is designated hereinafter as the anode thereof, and the pole designated by "−" is correspondingly designated as the cathode thereof.

As shown in FIG. 6, the bridge switching branches A can in each case have a series circuit comprising in each case a commutation diode 16 and an active bridge coupling switch 17. The arrangement of commutation diode 16 and bridge coupling switch 17 within a bridge switching branch A is interchangeable. In this case, the bridge coupling switches 17 can comprise MOSFET or IGBT power semiconductor switches, for example. The bridge switching branches A, are arranged in such a way that the collective terminals 8a, 8b, 8c couple the anodes of the bridge switching branches A connected thereto to the phase lines 2a, 2b and 2c, respectively, and that the collective terminals 8d, 8e, 8f couple the cathodes of the bridge switching branches connected thereto to the phase lines 2a, 2b and 2c, respectively. The cathodes of the bridge switching branches A coupled to the collective terminals 8a, 8b, 8c can be interconnected for their part at a common cathode collective point of the full-bridge circuit 9, while the anodes of the bridge switching branches A coupled to the collective terminals 8d, 8e, 8f are interconnected at a common anode collective point of the full-bridge circuit 9. The cathode collective point is in turn connected to the feed node 14a; the anode collective point is connected to the feed node 14b.

As a result of this type of interconnection, with bridge coupling switches 17 being closed in each case, the instantaneously highest potential of the phase lines 2a, 2b and 2c is in each case present at the cathode collective point of the full-bridge circuit 9 and thus at the feed node 14a and the instantaneously lowest potential of the phase lines 2a, 2b and 2c is in each case present at the anode collective point of the full-bridge circuit 9 and thus at the feed node 14b. In addition, a commutation inductor 15 can optionally be provided in each of the bridge switching branches A, said commutation inductors in each case being coupled in series with the diodes 16 and the bridge coupling switches 17. The arrangement of the commutation inductor 15 within the series circuit comprising commutation diodes 16, bridge coupling switch 17 and commutation inductor 15 is arbitrary here. The commutation inductors 15 here can buffer potential fluctuations which can occur at times on account of driving-governed stepped potential changes in the respective phase lines 2a, 2b and 2c, with the result that the diodes 16 are loaded to a lesser extent by frequent commutation processes.

If the DC voltage supply circuit serves only for drawing energy from the energy storage device 1, for example for supplying an on-board electrical power supply system, then the active bridge coupling switches 17 can be dispensed with. The latter are replaced by a conductive connection in this case. If energy is also intended to be able to fed into the energy storage device 1 via the DC voltage supply circuit 8, then by contrast the active bridge coupling switches 17 are required.

The DC voltage supply circuit 8 additionally has a module tapping circuit 6 having at least one module switching branch A. Four module switching branches A are provided in the present exemplary embodiment. The module switching branches A can be constructed analogously to the bridge switching branches A in FIG. 6, wherein once again the pole designations "+" and "−" of the bridge switching branch A in FIG. 6 correspond to the pole designations "+" and "−" of the module switching branches A in FIGS. 3 to 5. In this case, a first module switching branch A connects a first coupling node K between two energy storage modules 3 of one of the energy supply branches Z to the first feed node 14*a* in a switchable manner; a second module switching branch A connects said coupling node K to the second feed node 14*b*. A third and fourth module switching branch A connect a second coupling node between two energy storage modules 3 of another of the energy supply branches Z to the first feed node 14*a* and the second feed node 14*b*, respectively, in a switchable manner. In the present exemplary embodiment, therefore, two module switching branches A form a cathode collective point at the feed node 14*a*, and two further module switching branches A form an anode collective point at the feed node 14*b* of a DC voltage input stage 14. As a result of the interconnection of the coupling nodes K within the series circuit comprising the energy storage modules 3, a DC voltage level having a minimum voltage can always be guaranteed even at operating points of the energy storage device 1 requiring very low output voltages of the energy supply branches Z.

In the case of a number of the energy storage modules 3 divided uniformly on both sides of the respective coupling nodes, ideally an identical number of energy storage modules 3 in the respective energy supply branches Z on both sides of the respective coupling node K, in each case pairwise energy storage modules 3 can be switched pairwise with opposite polarities with full module output voltage in terms of absolute value, such that the common net contribution thereof to the total output voltage of the respective energy supply branch Z is zero. In this case, the pairs can be chosen in such a way that all the energy storage modules 3 on one side of the coupling node K are switched with the same polarity. One of the energy storage modules 3 can be operated in a clocked mode in order to realize the respectively required total output voltage of the energy supply branch Z. In this way, at the coupling node K relative to the second feed node 14*b* a potential can be tapped off which corresponds to the sum of the output voltages of all the energy storage modules 3 connected between the coupling node K and the feed node 14*b*.

Although this operating mode has the effect that the DC voltage input stage 14 is always operated with a minimum voltage, at the same time it results in an unequal discharging of the energy storage modules 3 of an energy supply branch Z. This imbalance can be compensated for again in other operating modes by a corresponding balancing method, for example. Alternatively, at times it is also possible to use only one of the energy supply branches Z for providing the DC voltage, while in the other energy supply branch Z all the energy storage modules 3 are correspondingly subjected to polarity reversal, such that the energy storage modules 3 discharged to a lesser extent are loaded to a greater extent again and feed energy back into the previously discharged energy storage modules 3.

According to the invention, the module tapping circuit 6 contains at least one of the four module switching branches A illustrated in the exemplary embodiment in accordance with FIG. 3. Embodiments of the module tapping circuit 6 are likewise also possible in which further coupling nodes K between further energy storage modules 3 of the energy storage device 1 are connected via module switching branches A to the feed node 14*a* and/or the feed node 14*b* of a DC voltage input stage. In this case, the module switching branches connected to the feed node 14*a* are always connected to said feed node 14*a* by their cathode, and the module switching branches connected to the feed node 14*b* are always connected to said feed node 14*b* by their anode.

There is a potential difference between the collective points of the full-bridge circuit 9 and module tapping circuit 6, which potential difference can be boosted by the DC voltage input stage 14—a boost converter 14 in the example in FIG. 3. In this case, the boost converter 14 can be designed to provide a DC voltage $U_{ZK}$ at the tapping terminals 8*g*, 8*h* of the DC voltage supply circuit 8 depending on the potential between the collective points of the full-bridge circuit 9 and module tapping circuit 6. The boost converter 14 can have for example at the first feed node 14*a* a converter inductor 10 and an output diode 11 in a series circuit, in the midpoint tap of which couples a converter switching element 12 to the second feed node 14*b*. Alternatively, the converter inductor 10 can also be provided between the anode collective point and the converter switching element 12, or two converter inductors 10 can be provided at both input terminals of the boost converter 14.

The converter switching element 12 can comprise a power semiconductor switch, for example, such as a MOSFET switch or an IGBT switch, for example. By way of example, an n-channel IGBT that is normally off can be used for the converter switching element 12. It should be clear here, however, that any other power semiconductor switch can likewise be used for the converter switching element 12.

There is the possibility of dispensing with the converter switching element 12, or leaving the converter switching element 12 in a permanently off state, particularly if the potential difference between the cathode and anode collective points is always within an input voltage range predefined by a further component connected to the tapping terminals 8*g*, 8*h*. In this case, the output diode 11 can also be dispensed with in some embodiments.

The DC voltage supply circuit 8 can furthermore have an intermediate circuit capacitor 13, which is connected between the tapping terminals 8*g*, 8*h* of the DC voltage supply circuit 8 and which is designed to buffer the current pulses output by the boost converter 14 and thus to generate a smoothed DC voltage $U_{ZK}$ at the output of the booster converter 14. By way of example, via the intermediate circuit capacitor 13, a DC-DC converter of an on-board electrical power supply system of an electrically operated vehicle can then be fed or said on-board electrical power supply system can also be directly connected to the intermediate circuit capacitor 13 in specific cases.

Figure 4:
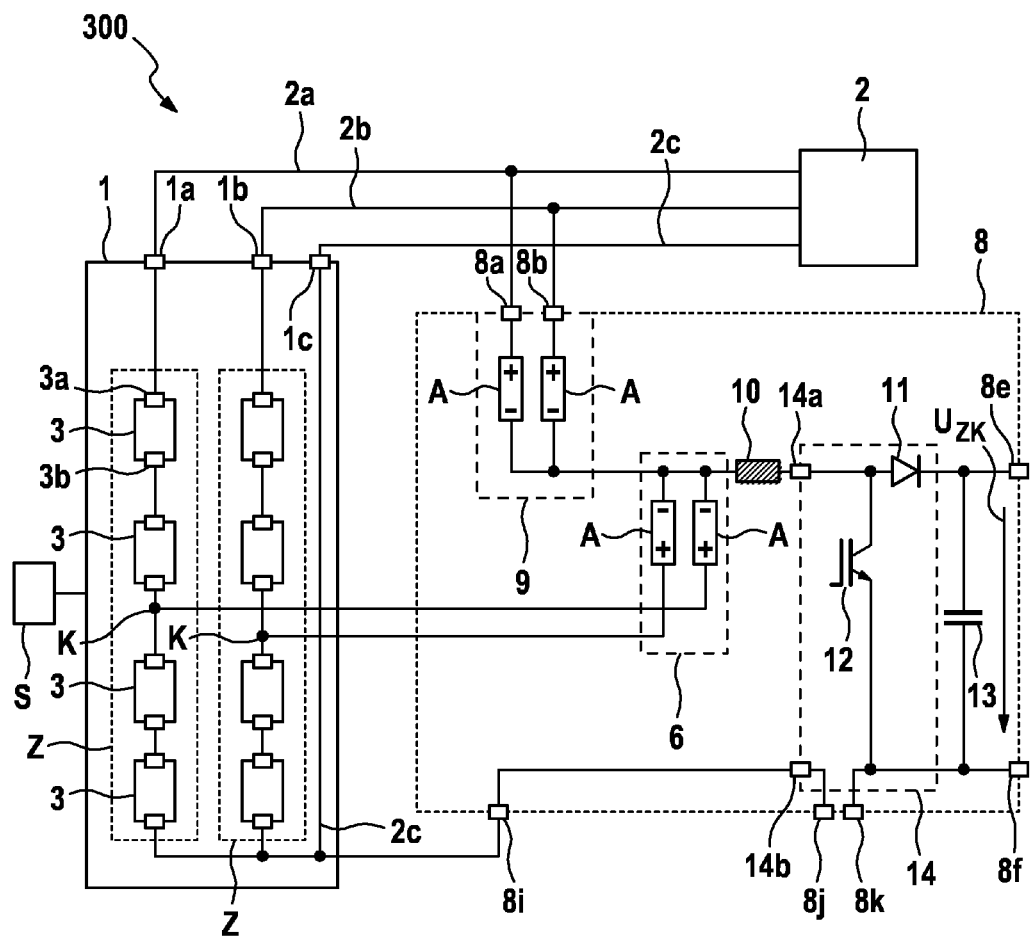
FIG. 4 shows a schematic illustration of a system comprising an energy storage device and a DC voltage supply circuit in accordance with a further embodiment of the present invention.

In contrast to the illustration shown by way of example in FIGS. 3 to 5, the DC voltage input stage 14 can also be realized by some other DC-DC converter, for example a forward converter in half-bridge connection or in full-bridge connection.

In FIG. 3, the number of bridge switching branches A in the bridge circuit 9 is in each case indicated by way of example by two times three=six and adapted to the number of output terminals 1*a*, 1*b*, 1*c* of the energy storage device 1. It should be clear here that any other number of bridge switching branches A is likewise possible, depending on what phase voltages are generated by the energy storage device 1.

The DC voltage supply circuit 8 can optionally furthermore have two charging circuit terminals 8*j* and 8*k*, via which a charging circuit is connected, which is coupled in series with the DC-DC converter via the two charging circuit terminals, and which is designed to provide a charging DC voltage for the energy storage cell modules 5 of the energy storage device 1. If no charging circuit is provided at this location, then the charging circuit terminals 8*j* and 8*k* are conductively connected to one another.

Figure 8:
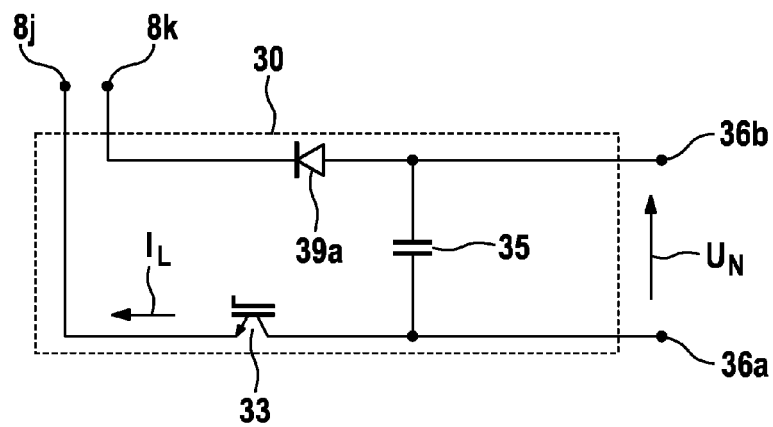
FIG. 8 shows a schematic illustration of a charging circuit for a system according to any of FIGS. 3 to 5 in accordance with a further embodiment of the present invention.
Figure 9:
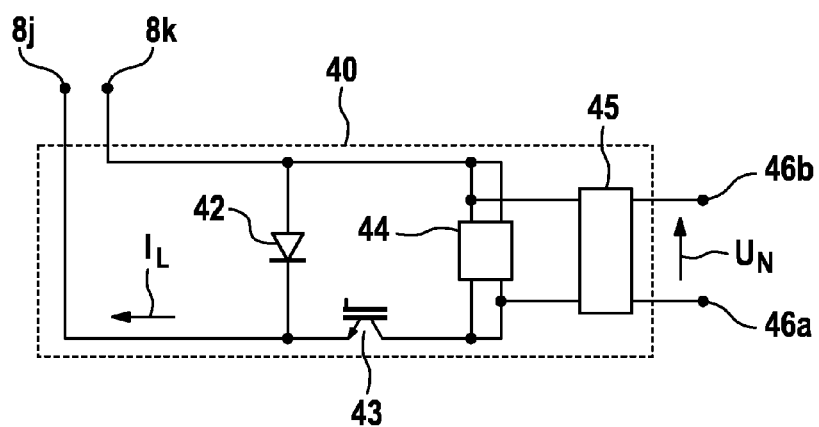
FIG. 9 shows a schematic illustration of a further charging circuit for a system according to any of FIGS. 3 to 5 in accordance with a further embodiment of the present invention.

FIGS. 8 and 9 show schematic illustrations of charging circuits 30 and 40, respectively, which can be used for example for charging one or a plurality of energy supply branches Z of an energy storage device 1 and in particular for feeding the charging circuit terminals 8j and 8k.

FIG. 8 shows a schematic illustration of a charging circuit 30 having input terminals 36a, 36b, at which a charging DC voltage $U_N$ can be fed in. The charging DC voltage $U_N$ can be generated in this case by circuit arrangements (not shown), for example DC-DC converters, open-loop-controlled or closed-loop-controlled rectifiers with power factor correction (PFC) or the like. The charging DC voltage $U_N$ can be provided for example by an energy supply network connected on the input side. The charging circuit 30 can furthermore have an intermediate circuit capacitor 35, across which a DC voltage can be tapped off and which considerably reduces the perturbing effect of pulsating currents both on the input side and on the output side of the charging circuit 30 or of switching processes in the charging circuit 30 itself on the charging DC voltage $U_N$. At charging circuit terminals 8j and 8k of the charging circuit 30, an output voltage of the charging circuit 30 can be tapped off which can serve for charging a connected energy storage device, for example a series of energy storage modules 3 or an energy supply branch Z of an energy storage device 1 as illustrated in FIGS. 3 to 5.

The charging circuit 30 has a semiconductor switch 33 and a freewheeling diode 39a, which implement a buck-converter. By way of example, the output voltage of the energy storage device 1 to be charged, for example of a series of energy storage modules 3 or an energy supply branch of the energy storage device 1 as illustrated in FIG. 3 to 5, or alternatively the duty ratio of the buck converter implemented via the semiconductor switch 33 can serve as a manipulated variable for the charging current $I_L$ of the charging circuit 30. It can also be possible to use the input voltage $U_N$ present across the intermediate circuit capacitor 35 as a manipulated variable for the charging current $I_L$. The buck converter can for example also be operated in an operating state with the constant duty ratio of 1, such that the semiconductor switch 33 can remain permanently closed. In this case, it can also be possible to dispense with the semiconductor switch 33.

FIG. 9 shows a schematic illustration of a charging circuit 40 having input terminals 46a, 46b, at which a charging AC voltage $U_N$ can be fed in. In this case, the charging AC voltage $U_N$ can be generated by circuit arrangements (not shown), for example inverter full-bridges or the like. The charging AC voltage $U_N$ preferably has a rectangular intermittent or non-intermittent profile and a high fundamental frequency. The charging AC voltage $U_N$ can be provided for example by an energy supply network connected on the input side with an inverter or converter bridge connected downstream. The charging circuit 40 can furthermore have a transformer 45, the primary winding of which is coupled to the input terminals 46a, 46b. The secondary winding of the transformer 45 can be coupled to a full-bridge rectifier circuit 44 comprising four diodes, at the output of which a pulsating DC voltage can be tapped off. A variation of the interval length of the pulsating DC voltage can be carried out via a variation of the time intervals in which the charging AC voltage $U_N$ present at the primary winding of the transformer 45 and thus also the corresponding secondary voltage at the secondary winding of the transformer 45 have the value 0. At the charging circuit terminals 8j, 8k of the charging circuit 40, an output voltage of the charging circuit 40 can be tapped off which can serve for charging for example a series of energy storage modules 5 or a branch of an energy storage device 1 as illustrated in FIGS. 3 to 5.

The charging circuit 40 has a freewheeling diode 42 and a semiconductor switch 43, which serve as a buck converter for the pulsating DC voltage of the full-bridge rectifier circuit 44. In this case, provision can also be made for integrating a converter inductor 41 for smoothing the charging voltage into the charging circuit 40. By way of example, the output voltage of the energy storage modules 3 to be charged or of an energy supply branch Z of the energy storage device 1 as illustrated in FIG. 3 to 5, or alternatively the DC component of the pulsating DC voltage can be used as a manipulated variable for the charging current $I_L$ flowing through the converter inductor 41.

In a further embodiment, the freewheeling diode 42 can be dispensed with without replacement. In this case, the diodes of the full-bridge rectifier circuit 44 additionally perform the function of the freewheeling diode 42. As a result, a component is saved, but in return the efficiency of the charging circuit 40 is reduced.

With the energy storage device 1 and the DC voltage supply circuit 8 in FIG. 3, at an operating point of the electrical machine 2 which requires a low machine voltage, for example low traveling speed or standstill of an electrically operated vehicle, the module tapping circuit 6 can be activated by the energy storage modules 3 of the energy storage device 1 being driven in such a way that a potential suitable for feeding the DC voltage supply circuit 8 is present at at least one coupling node K. If the associated module switching branches A are embodied with module coupling switches 17, then in addition at least the module coupling switch 17 of that module switching branch A which, in this operating state, performs the current routing from the coupling node K to the feed terminal 14a or from the feed terminal 14b to the coupling node K must be closed.

FIG. 4 shows a schematic illustration of a system 300 comprising an energy storage device 1 and a DC voltage supply circuit 8. The system 300 differs from the system 200 shown in FIG. 3 essentially in that the bridge circuit 9 is embodied as a half-bridge circuit with cathode collective point, that is to say that only the phase tapping terminals 8a and 8b are provided, via which bridge switching branches A are connected to the phase lines 2a, 2b of the energy storage device 1. In the DC voltage supply circuit 8 in FIG. 4, therefore, the respectively instantaneously highest potential of the phase lines 2a, 2b is always present at a cathode collective point of the half-bridge circuit 9. Said cathode collective point is in turn connected to the feed node 14a. By contrast, the feed node 14b is connected to the busbar 2c of the energy storage device. In the module tapping circuit 6, in the embodiment illustrated in FIG. 4, exclusively module switching branches A are provided which in each case couple a coupling node K between two energy storage modules 3 of an energy supply branch Z to the feed node 14a. In the DC voltage supply circuit 8 in FIG. 4 as well, there is a potential difference between the cathode collective point of the half-bridge circuit 9 and thus the feed node 14a and the feed node 14b, which potential difference can be boosted by the boost converter 14 to a DC voltage $U_{ZK}$.

In a similar way, FIG. 5 shows a schematic illustration of a system 400 comprising an energy storage device 1 and a DC voltage supply circuit 8. The system 400 differs from the system 200 shown in FIG. 3 essentially in that the bridge circuit 9 is embodied as a half-bridge circuit with anode collective point, that is to say that only the phase tapping terminals 8d and 8e are provided, via which bridge switching branches A are connected to the phase lines 2a, 2b of the energy storage device 1. In the DC voltage supply circuit 8 in FIG. 5, therefore, the respectively instantaneously lowest potential of the phase lines 2a, 2b is always present at an anode collective point of the half-bridge circuit 9. Said anode collective point is in turn connected to the feed node 14b. In this embodiment, by contrast, the feed node 14a is connected to the busbar 2c of the energy storage device. In the module tapping circuit 6, in the embodiment illustrated in FIG. 5, exclusively module switching branches A are provided which in each case couple a coupling node K between two energy storage modules 3 of an energy supply branch Z to the feed node 14b. In the DC voltage supply circuit 8 in FIG. 5 as well, there is a potential difference between the feed node 14a and the anode collective point of the half-bridge circuit 9 and thus the feed node 14b, which potential difference can be boosted by the boost converter 14 to a DC voltage $U_{ZK}$.

The optional charging terminals 8j and 8k can also be arranged at the feed node 14a instead of the feed node 14b.

With the systems 300 and 400 in FIGS. 4 and 5, at an operating point of the electrical machine 2 which requires a low machine voltage, for example low traveling speed or standstill of an electrically operated vehicle, the module tapping circuits 6 can be activated by the energy storage modules 3 of the energy storage device 1 being driven in such a way that a potential suitable for feeding the DC voltage supply circuit 8 is present at at least one coupling node K. If the associated module switching branch A is embodied with a module coupling switch 17, then in addition at least the module coupling switch 17 of said module switching branch A must be closed.

This ensures that the output voltage of the module tapping circuit 6 cannot fall below the sum of the module voltages of the energy storage modules 3 connected in series between the coupling nodes K and the busbar 2c if said energy storage modules are correspondingly operated with full output voltage.

In charging operation, that is to say with an activated charging circuit 30 or 40 in so-called range extender operation, individual semiconductor switches 17 of the bridge circuit 9 and/or of the module tapping circuit 6 can be turned off in order that the charging current of the charging current 30 or 40 can always be driven via the output terminals 1a, 1b, 1c or coupling nodes K that are instantaneously suitable for feeding energy into the energy storage device 1, against the voltage currently present between them. Individual semiconductor switches 17 of the module switching branches A and/or bridge switching branches A can be turned off in a targeted manner in order to enable charging of the respective other energy supply branches Z.

All the switching elements of the circuit arrangements specified can comprise power semiconductor switches, for example normally off or normally on n- or p-channel MOSFET switches or corresponding IGBT switches. With the use of power semiconductor switches having a defined and sufficient reverse blocking capability, the corresponding series circuits comprising diodes can be dispensed with.

FIG. 7 shows a schematic illustration of a method 20 for providing a DC voltage from an energy storage device, in particular an energy storage device 1 as described in association with FIGS. 1 to 6 and 8 to 9. The method 20 can be used for example for providing a DC voltage from an energy storage device 1 of an electrically operated vehicle with an electrical drive system 200, 300 or 400 in FIGS. 3, 4 and 5, respectively, in particular for a DC voltage on-board electrical power supply system of the vehicle.

Firstly, a step 21 can involve determining the output voltage of the energy supply branches Z at the output terminals 1a, 1b of the energy storage device 1. Depending on the output voltage determined, step 22 can then involve switching coupling of a coupling node K between two energy storage modules 3 of one of the energy supply branches Z to the first feed node 14a or the second feed node 14b. This is advantageously carried out primarily if the output voltage determined is lower than the maximum output voltage of an individual energy storage module 3. Likewise, step 22 can involve a switching coupling of a first coupling node K between two energy storage modules 3 of one of the energy supply branches Z to the first feed node 14a and switching coupling of a second coupling node K between two energy storage modules 3 of one of the energy supply branches Z to the second feed node 14b.

In this operating mode, step 24 can then involve operating the energy storage modules 3 of each of the energy supply branches Z that are situated between the coupling nodes K and the busbar 2c of the energy storage device 1 in such a way that at least the voltage of an energy storage cell module 5 is always present between the feed nodes 14a and 14b. It is particularly advantageous, however, to operate the energy storage modules 3 at issue with the maximum or the inverted maximum module output voltage depending on the current flow direction. The output voltage of the other energy storage modules 3 of each of the energy supply branches Z can be set in step 25 in such a way that the total output voltage of the energy supply branches Z at the output terminals 1a, 1b of the energy storage device 1 corresponds to the setpoint value determined in step 21.

The invention claimed is:

1. A system (200; 300; 400) comprising an energy storage device (1) and a DC voltage supply circuit (8), wherein the energy storage device (1) has at least two energy supply branches (Z) which are coupled at a first output in each case to at least one output terminal (1a, 1b) of the energy storage device (1) for generating an AC voltage at the output terminals (1a, 1b) and are coupled at a second output to a common busbar (2c) wherein each of the energy supply branches (Z) has a multiplicity of series-connected energy storage modules (3) which in each case comprise:

an energy storage cell module (5) having at least one energy storage cell (5a, 5k); and a coupling device (7) having a coupling bridge circuit composed of coupling elements (7a, 7b, 7c, 7d) wherein the coupling elements (7a, 7b, 7c, 7d) are designed selectively to switch the energy storage cell module (5) into the respective energy supply branch (Z) or to bypass it in the energy supply branch (Z), and wherein the DC voltage supply circuit (8) has:

a bridge circuit (9) having a multiplicity of first feed terminals (8a, 8b) which are in each case coupled to one of the output terminals (1a, 1b) of the energy storage device (1);

two feed nodes (14a, 14b), at least one of which is coupled to the bridge circuit (9); and a module tapping circuit (6), which has at least one module switching branch (A) having a commutation diode (16), wherein each of the at least one module switching branches (A) connects a coupling node (K) between two energy storage modules (3) of one of the energy supply branches (Z) to a feed node (14a, 14b) in a switchable manner.

2. The system (200; 300; 400) as claimed in claim 1, characterized in that at least one of the at least one module switching branches (A) has, in addition to the commutation diode (16), a module coupling switch (17) connected in series with said commutation diode (16).

3. The system (200; 300; 400) as claimed in claim 1, furthermore comprising:
a DC-DC converter (14) coupled between the first feed node (14a) and the second feed node (14b).

4. The system (200; 300; 400) as claimed in claim 3, wherein the DC-DC converter (14) has a step-up converter or a forward converter.

5. The system (200; 300; 400) as claimed in claim 1, wherein the DC voltage supply circuit (8) has two charging circuit terminals (8j, 8k) and a charging circuit, wherein the charging circuit in the presence simultaneously of the DC-DC converter (14) is coupled in series with the DC-DC converter (14) via the two charging circuit terminals (8j, 8k) and wherein the charging circuit in the absence of the DC-DC converter (14) is directly connected to the feed nodes (14a; 14b) by the two charging circuit terminals (8j; 8k) and wherein the charging circuit is designed to provide a charging DC voltage for the energy storage cell modules (5) of the energy storage device (1).

6. The system (200; 300; 400) as claimed in claim 1, wherein the bridge circuit (9) has a multiplicity of first bridge branches (A) having a diode (16) or the series circuit formed by a diode (16) and a bridge coupling switch (17) which are coupled in each case between the feed node (14a; 14b) connected to the bridge circuit and one of the multiplicity of first feed terminals (8a, 8b).

7. The system (200; 300; 400) as claimed in claim 1, wherein the bridge circuit has a further first feed terminal (8c), which is connected to the output terminal (1c) of the energy storage device (1) and thus to the busbar (2c) thereof.

8. The system (200; 300; 400) as claimed in claim 1, wherein the bridge circuit (9) has both a multiplicity of first feed terminals (8a, 8b, 8c) and a multiplicity of second feed terminals (8d, 8e, 8f), which are coupled in each case to one of the output terminals (1a, 1b) or the busbar (2c) of the energy storage device (1).

9. The system (200; 300; 400) as claimed in claim 7, wherein the bridge circuit (9) has a further bridge switching branch (A), which connects the further first feed terminal (8c) or the further second feed terminal (8f) to that one of the two feed nodes (14a; 14b) which is already connected via the bridge circuit (9) to the first feed terminals (8a; 8b) or to the second feed nodes (8d, 8e).

10. The system (200; 300; 400) as claimed in claim 8, wherein the bridge circuit (9) has a multiplicity of first bridge branches (A) and a multiplicity of second bridge switching branches (A) having in each case a diode (16) or a series circuit formed by a diode (16) and a bridge coupling switch (17), wherein the first bridge switching branches (A) are connected in each case between one of the multiplicity of first feed terminals (8a; 8b; 8c) and the first feed node (14a), and wherein the second bridge switching branches (A) are connected in each case between one of the multiplicity of second feed terminals (8d; 8e; 8f) and the second feed node (14b), and wherein the direct electrically conductive connection between one of the feed nodes (14a; 14b) and the busbar (2c) of the energy storage device (1) is obviated.

11. The system as claimed in claim 10, wherein each of the at least one coupling nodes K is connected to an arbitrary feed node (14a; 14b) via a module switching branch (A) or is alternatively connected to each of the two feed nodes (14a; 14b) via a respective module switching branch (A).

12. The system (200; 300; 400) as claimed in claim 1, wherein each energy supply branch (Z) of the energy storage device (1) has maximally one coupling node (K), and wherein the number of energy storage modules (3) in the respective energy supply branches (Z) is identical on both sides of the respective coupling node (K).

13. The system (200; 300; 400) as claimed in claim 1, furthermore comprising:
an n-phase electrical machine (2) having n phase terminals, coupled to the output terminals (1a, 1b) of the energy storage device (1), wherein n≥1.

14. The system (200; 300; 400) as claimed in claim 13, wherein the n-phase electrical machine has a led-out winding star point, and wherein said winding star point is connected to the output terminal (1c) of the energy storage device (1) and thus to the busbar (2c) thereof.

15. A method (20) for providing a DC voltage from a system (200; 300; 400) as claimed in claim 1, comprising the following steps:
determining (21) the output voltage of the energy supply branches (Z) at the output terminals (1a, 1b) of the energy storage device (1);
switching coupling (22) of at least one coupling node (K) between two energy storage modules (3) of one of the energy supply branches (Z) to a feed node (14a; 14b) that is connectable to said coupling node via a module switching branch (A) if the determined output voltage of the energy storage device (1) is lower than the maximum output voltage of an individual energy storage module (3);
operating (24) the energy storage modules (3) situated between the coupling nodes (K) and a busbar (2c) of the energy storage device (1) in such a way that a potential that differs from the potential of the busbar (2c) at least by the maximum output voltage of an energy storage module (3) is always present at least at one of the coupling nodes (K); and
setting (25) the output voltage of the other energy storage modules (3) of each of the energy supply branches (Z) in such a way that the total output voltage of the energy supply branches (Z) at the output terminals (1a, 1b) of the energy storage device (1) corresponds to the voltage determined in step (21).

16. The system (200; 300; 400) as claimed in claim 1, wherein the bridge circuit (9) has a multiplicity of first bridge branches (A) having a diode (16) or the series circuit formed by a diode (16) and a bridge coupling switch (17) which are coupled in each case between the feed node (14a; 14b) connected to the bridge circuit and one of a multiplicity of second feed terminals (8d; 8e).

17. The system (200; 300; 400) as claimed in claim 1, wherein the bridge circuit has a further second feed terminal (8f), which is connected to the output terminal (1c) of the energy storage device (1) and thus to the busbar (2c) thereof.

* * * * *